T. T. FURLONG.
Horse-Boot.

No. 212,595.  Patented Feb. 25, 1879.

Witnesses
G. R. Hoffman
N. Cowles

Inventor
Thomas T. Furlong
By Gridley & Co
Attys

UNITED STATES PATENT OFFICE.

THOMAS T. FURLONG, OF CHICAGO, ILLINOIS.

IMPROVEMENT IN HORSE-BOOTS.

Specification forming part of Letters Patent No. 212,595, dated February 25, 1879; application filed July 25, 1878.

*To all whom it may concern:*

Be it known that I, THOMAS T. FURLONG, of Chicago, in the county of Cook and State of Illinois, have invented new and useful Improvements in Sponge-Holders or Foot-Coolers for Horses' Feet; and I do hereby declare the following to be a full, clear, and exact description thereof, reference being had to the accompanying drawings, forming part of this specification, in which—

Figure 1:
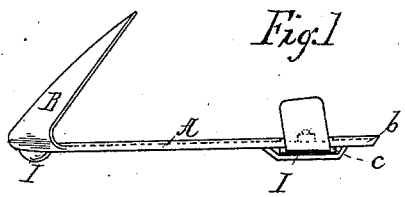
Figure 2:
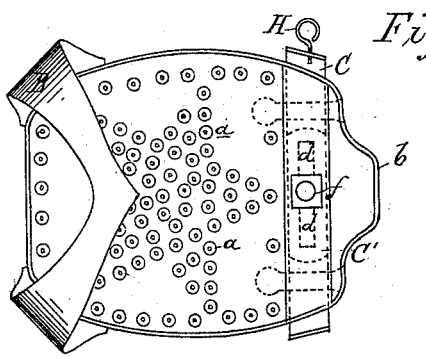
Figure 4:
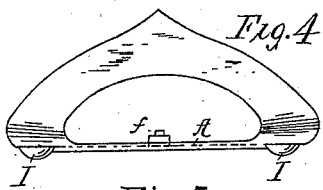
Figure 3:
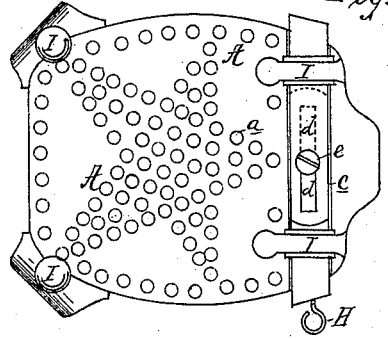
Figure 5:

Figure 1 represents a side elevation of the foot-cooler embodying my improvements. Fig. 2 represents a general plan or top view of the same. Fig. 3 represents a bottom view of the same. Fig. 4 represents a front view of the same, and Fig. 5 represents an enlarged sectional view of one of the perforated projections.

Like letters of reference indicate like parts.

It is well known that horses are compelled to stand more or less upon hard and dry floors, and by reason thereof their hoofs become hard and dry and feverish, and consequently tender.

The object of my invention is to improve the condition of horses' feet; and to that end my invention consists in the construction of a sponge-holder or foot-cooler that may be readily attached to or removed from the hoof or foot of a horse, as hereinafter more fully described and claimed.

In the drawings, A represents the base-plate of the sponge-holder or foot-cooler, which may be made of any suitable metal, but preferably of malleable iron, and is so formed as to fit the lower surface of the hoof or shoe of a horse. The upper surface of said base-plate is provided with a series of cone-shaped projections, *a a*, which extend slightly above the upper surface of said base-plate, and the upper ends of which are perforated. The outer edge of said base-plate is turned upward, so as to form a flange, *b*.

The object of said perforated projections *a* and flange *b* is to retain upon the upper surface of the base-plate a portion of the water or other liquid with which the sponge may be saturated, and at the same time admit of a percolation of air through said perforated projections.

B represents a metal clamp, which is permanently attached to the forward end of the base-plate A, and is so formed as to fit upon and clamp the front of the hoof, as shown.

Upon the lower side and near the rear end of the base-plate is formed a depression or groove, *c*, within which are placed the adjustable and sliding heel-clamps C C', the outer ends of which extend beyond the base-plate and are turned upward, as shown in Fig. 1. Each of said heel-clamps is provided at or near its inner end with a slot, *d*, through which passes a set-screw, *e*, which takes into a corresponding screw-threaded nut, *f*, and by means of which said slots the heel-clamps may be moved laterally and adjusted to fit hoofs of different sizes, and when fitted or adjusted are held firmly in position by means of said screw and nut.

The upwardly-projecting ends of the heel-clamps, when adjusted as described, rest against the sides of the hoof or shoe, and the foot-cooler is held firmly in position by means of the clamp B and thumb-screw H, which passes through the upper end of one of the heel-clamps, and bears against the hoof or shoe.

To the under side of the base-plate A are permanently attached four metal bearings or calks, I, for the purpose of raising the foot of the horse from the floor and forming a space between the base-plate A and floor, for the circulation of air when a plate-shoe is used.

In using said sponge-holder or foot-cooler, a piece of sponge, conforming in shape to the upper surface of plate A, is saturated with water, or such medicated liquid as may be desired, and is placed upon the base-plate A, and the cooler or holder is then secured in place upon the hoof by means of the clamps B C C', and so as to cause the sponge to bear against the lower surface of the hoof, and by which means the hoof is kept cool and moist, and in a more healthy condition.

Having thus described my invention, what I claim as new, and desire to secure by Letters Patent, is—

1. The combination, with the base-plate A, provided with the flange *b*, projecting from and surrounding the upper surface of said plate, of the clamps B and C C', substantially as and for the purpose specified.

2. The base-plate A, provided with the perforated projections $a$, projecting upward from the upper surface of said plate, and flange $b$, substantially as and for the purpose specified.

3. The combination, with the base-plate A, provided with the perforated projections $a$ and flange $b$, of the fixed clamp B, adjustable clamps C C', set-screw $e$, nut $f$, and thumb-screw H, substantially as and for the purpose specified.

4. The combination, with the base-plate A, provided with the perforated projections $a$ and flange $b$, of the bearings or calks I, substantially as and for the purpose specified.

THOMAS T. FURLONG.

Witnesses:
G. R. HOFFMAN,
GEORGE P. BARTON.